United States Patent [19]

Costa

[11] Patent Number: 4,480,856
[45] Date of Patent: Nov. 6, 1984

[54] COUPLING

[75] Inventor: Robert B. Costa, Santee, Calif.

[73] Assignee: RIS Irrigation Systems, El Cajon, Calif.

[21] Appl. No.: 425,421

[22] Filed: Sep. 28, 1982

[51] Int. Cl.³ ............... F16L 55/00; F16L 33/00; F16L 25/00
[52] U.S. Cl. ............................. 285/5; 285/255; 285/397; 285/421
[58] Field of Search ............... 285/5, 255, 242, 397, 285/421

[56] References Cited

U.S. PATENT DOCUMENTS 4,021,061 5/1977 Zimmerman ............ 285/255 X
4,088,349 5/1978 Guest ..................... 285/255

FOREIGN PATENT DOCUMENTS 225005 4/1959 Australia ................ 285/242
673383 11/1963 Canada .................. 285/242

Primary Examiner—Richard J. Scanlan, Jr.
Attorney, Agent, or Firm—Gordon L. Peterson

[57] ABSTRACT

A coupling for flexible conduit of irregular configuration having an inner member adapted to be at least partially received within the flexible conduit. The inner member has a first conical surface. A locking member is retained on the inner member and is provided with a second conical surface which tapers radially inwardly and terminates in substantially a knife edge. When the inner member is received within the flexible conduit, the locking member may be moved such that the flexible conduit is squeezed between the knife edge and the first conical surface to seal the coupling to the conduit.

10 Claims, 8 Drawing Figures

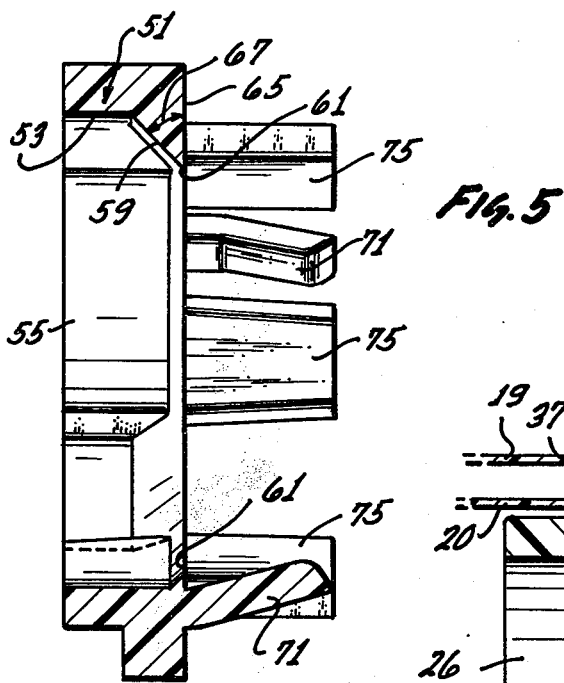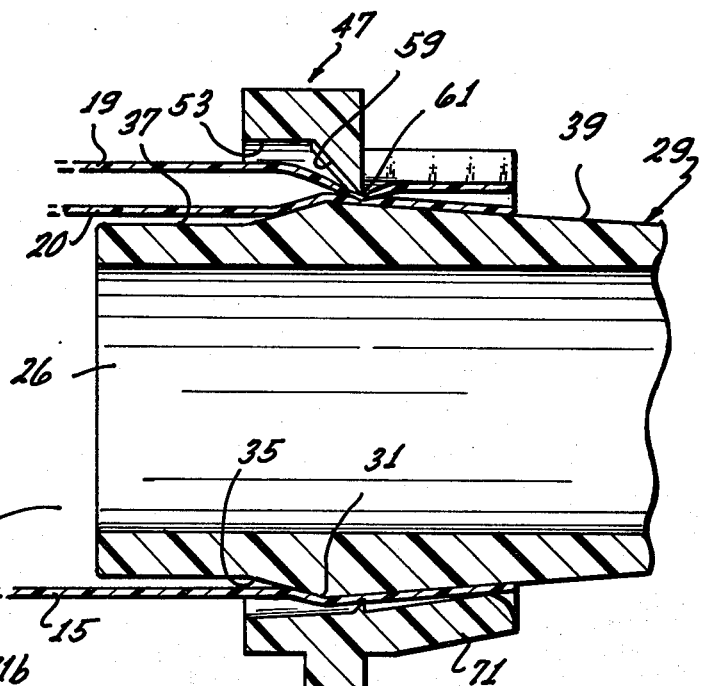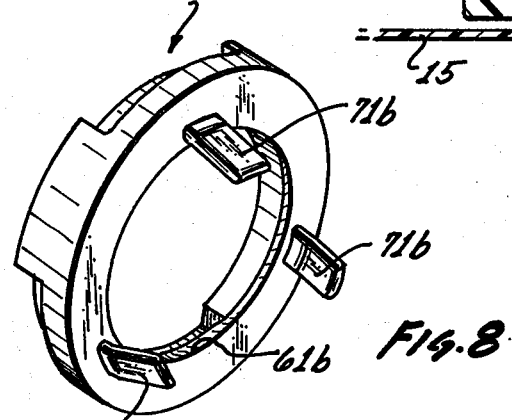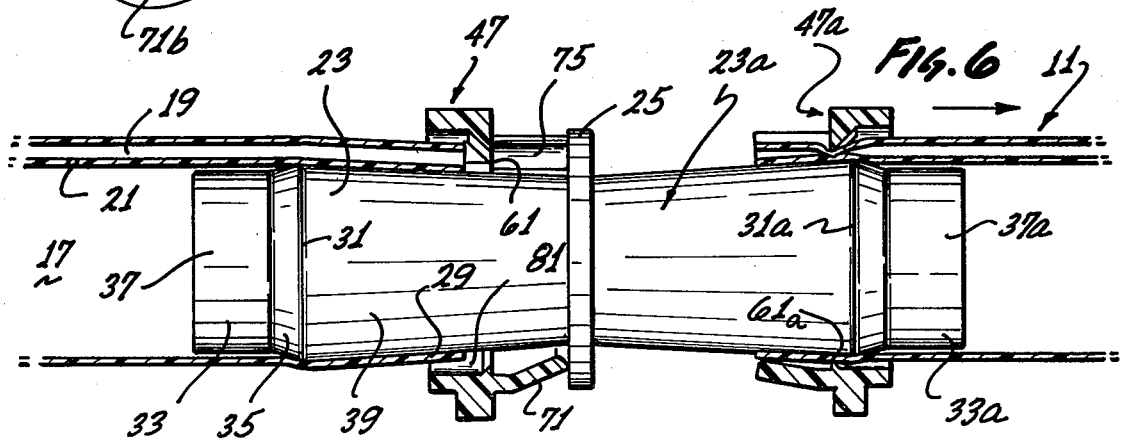

COUPLING

BACKGROUND OF THE INVENTION

This invention relates to coupling devices for hoses and flexible irrigation conduits, particularly those having an irregular outer periphery as viewed in radial cross section.

Various types of couplings are known for conduits having a regular, i.e., a circular radial cross section and a wall of uniform thickness. Couplings are generally easy to attach and seal to conduits having such a regular configuration, provided the conduits have walls of uniform thickness. However, with conduits having an irregular configuration or nonuniform wall thickness, it becomes difficult to provide an effective seal between the coupling and the conduit.

A common type of irregularly configured conduit having a noncircular cross section comprises a flexible conduit having a large primary passage and a secondary passage with a common wall between the passages. The flexible conduit is typically extruded and has a wall thickness that varies within a certain tolerance. With such a conduit, it is difficult to provide a good seal between the conduit and the coupling because of the noncircular configuration and varying thickness of the conduit wall.

An example of a coupling device for an irrigation conduit having a generally circular cross section is shown in U.S. Pat. No. 4,021,061. This patent shows a coupling device with an inner or male member having near its end an enlarged circumferential portion with a series of conical stages with different degrees of taper. An annular female member or retaining sleeve is retained on the male member. A hose or conduit is attached to the connector by pushing it through an annular gap between the female sleeve portion and the enlarged male member. A wedging action is created by the inside sleeve surface and one conical surface of the male member to provide some degree of sealing.

The above patent also shows a connector for a conduit of irregular configuration, such as a conduit having a primary passage and a secondary passage. In this embodiment, the female sleeve member has a notch or cut out section with a radially extending bearing surface that forms a surface for providing a pinching action on the secondary passage of the dual passage conduit.

The problem with the above construction is that when the coupling is used with conduits of irregular configuration or nonuniform wall thickness, the female sleeve member does not provide an effective seal around the conduit and on the secondary passage.

SUMMARY OF THE INVENTION

The present invention overcomes the aforementioned problems. The present invention provides a coupling for flexible conduits having regular or irregular configurations wherein the coupling is provided with a locking member having a knife edge which provides an effective seal when the coupling is attached to the conduits. The knife edge is effective even with flexible conduits having dual passages and walls that vary in thickness.

The coupling of the present invention is adapted for use with a flexible conduit having a wall. The coupling has an inner member which is at least partially received within the flexible conduit. The inner member has an outer surface which is provided with a circumferentially extending region. A nose section of the outer surface extends in one direction from the region and is adapted to facilitate insertion of the inner member into the flexible conduit. A first conical surface extends in the other direction from the region and tapers radially inwardly as it extends away from said region. The nose section, the region, and at least a portion of the first conical surface are received within the flexible conduit.

A locking member is adapted to receive the inner member and the flexible conduit and serves to attach the two and provide an effective seal therebetween. The locking member includes a sleeve with an inner surface defining a passage through the sleeve. The inner member and the flexible conduit are received within the passage. The inner surface confronts the outer surface of the inner member when the inner member is received within the passage. The passage of the sleeve has a second conical surface which tapers radially inwardly and terminates in substantially a knife edge.

The angle of taper of the second conical surface is greater than the angle of taper of the first conical surface of the outer surface. The knife edge forces axial displacement of some material of the wall of the flexible conduit to force conformity of the irregularly configured flexible conduit and the inner member such that a fluid tight seal is formed therebetween. By using this angle of taper relationship, the knife can perform this important sealing function. In the preferred arrangement, the first and second conical surfaces should diverge toward the circumferentially extending region at least 15°. In other words, the difference in the angles of taper of the first and second surfaces should be at least 15°.

The sleeve of the locking member may be provided with an intersecting wall which intersects the second conical surface of the inner surface to define the knife edge. The angle at which the intersecting wall intersects the second conical surface may be termed the included angle. If the included angle is too large the knife edge cannot easily displace the material of the wall of the flexible conduit. At the same time, if the included angle is very small, it may affect the structural rigidity and integrity of the knife edge. Preferably also, the knife edge should be no more than 0.005 inches in axial dimension or 0.003 inches of radius.

The locking member may be slightly resilient and adapted to accommodate some variation in the thickness of the wall of the flexible conduit.

Generally, the locking member is retained on the inner member. To prevent any accidental loss of the locking member the locking member may be provided with at least one retaining finger attached to the sleeve of the locking member. The retaining finger projects radially inwardly as it extends axially away from the sleeve. It serves to frictionally engage part of the first conical surface when the locking member is moved across. The friction between the retaining finger and the first conical surface increases as the retaining finger approaches the circumferentially extending region. Thus the retaining finger prevents any accidental dislodgement of the locking member from the inner member.

In addition to the retaining finger, the locking member may optionally be provided with at least one spacing finger attached to the sleeve and spaced from the retaining finger. The retaining finger may also serve as a spacing finger. The purpose of the spacing finger, which has greater structural rigidity and strength than the retaining finger, is to space the sleeve from an adjacent shoulder portion of the inner member and to help bear the impact force when the locking member impacts against the shoulder portion. The spacing finger prevents strain on the retaining finger that would result from the impact force in the absence of the spacing finger.

The sleeve may be provided with a notch portion. The notch portion is arranged such that the second conical surface at the notch portion is longer in the axial direction than the second conical surface outside of the notch portion. When the coupling of the present invention is used with irrigation lines having dual passages, an advantage is obtained by providing at least one notch portion in the sleeve of the locking member. The notch portion is oriented to face and receive the secondary passage and the increased length of the second conical surface facilitates in squeezing the secondary passage against the knife edge.

The coupling of the present invention may be used with a flexible conduit having a regular configuration, i.e. a generally circular cross section and wall having uniform thickness. However, the provision of the knife edge permits the coupling to be used effectively even with flexible conduits of irregular configuration, i.e. having noncircular cross section and a wall thickness that varies within a certain tolerance. For example, the coupling may be used with a flexible irrigation conduit having a noncircular radial cross section. Such type of irrigation conduits may have wall means defining a primary passage and a secondary passage with a common wall between the two passages and transfer ports in the common wall between the two passages and discharge ports leading from the secondary passage to the exterior of the irrigation conduit. The knife edge of the locking member locks the dual passage irrigation line to the inner member and provides an effective seal therebetween.

The coupling of the present invention is attached to a flexible conduit by first positioning the locking member at a distance away from the circumferentially extending region and in an abutting relationship with the shoulder of the inner member. The inner member is received within the flexible conduit and the flexible conduit is pressed within the generally annular gap of the confronting inner surface of the sleeve and the outer surface of the inner member. This causes the knife edge to be engaged by the outer periphery of the wall of the flexible conduit. In the next step, the flexible conduit is moved in a direction to remove the inner member. This causes the locking member, which engages the flexible conduit by means of the knife edge, to travel with the flexible conduit. The angle of divergence between the first conical surface and the second conical surface allows the wall of the flexible conduit to be squeezed or pinched between the knife edge and the first conical surface. The knife edge causes extrusion of the wall of the flexible conduit thereby providing an effective seal between the inner member and the flexible conduit.

BRIEF DESCRIPTION OF THE DRAWINGS

FIG. 5 is a sectional view of the locking member along lines 5—5 of FIG. 4.

FIG. 6 is a longitudinal sectional view of the construction of FIG. 1 with the right hand section of the irrigation conduit installed on the coupling and the left hand section of the irrigation conduit about to be installed.

FIG. 7 is an enlarged fragmentary view of the left hand portion of FIG. 6 and shows the coupling in its installed position.

FIG. 8 is a perspective view of a second form of locking ring.

DESCRIPTION OF THE PREFERRED EMBODIMENT

Figure 1:
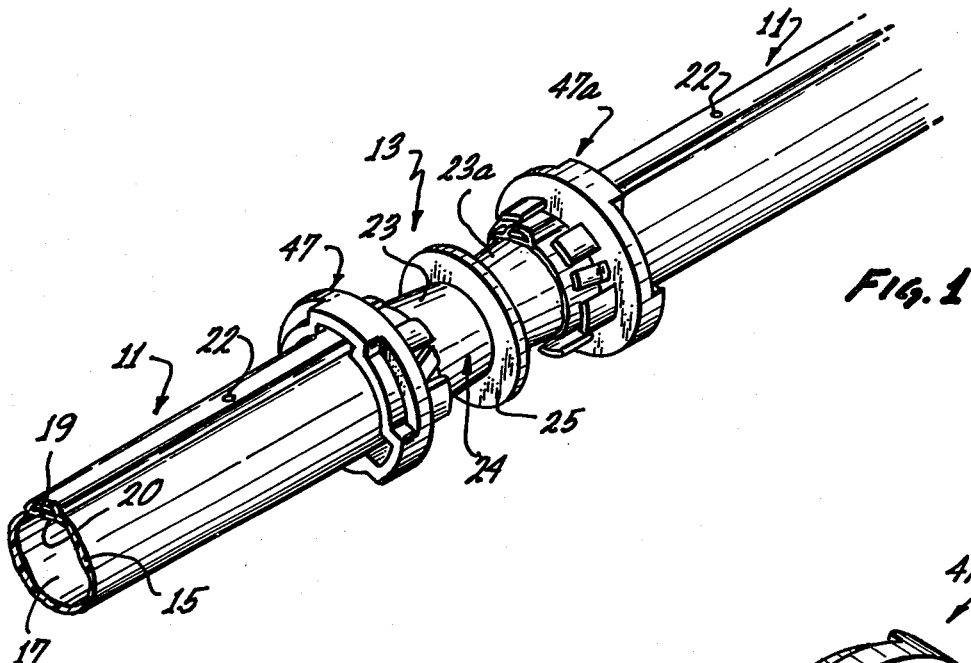
FIG. 1 is a perspective view of the coupling of the present invention attached to two sections of irrigation conduits.

FIG. 1 shows two sections of flexible irrigation conduit 11 attached to a coupling 13. Although the coupling 13 of the present invention may be used with different types of flexible conduits, in the embodiment illustrated in FIG. 1, the irrigation conduit 11 has a flexible wall 15 forming a generally cylindrical primary passage 17 and a secondary passage 19 with a common wall 20 between the two passages. The irrigation conduit 11 has transfer ports 21 (FIG. 6) in the common wall 20 between the passages and discharge ports 22 leading from the secondary passages 19 to the exterior of the irrigation conduit. The irrigation conduit 11 is noncircular in radial cross section, i.e. it has an irregular configuration, and the thickness of the wall 15 may vary within certain tolerances.

The coupling 13 comprises an inner member 24 having an axial passage 26 extending therethrough. The inner member 24 is adapted to be at least partially received within the primary passage 17 of the irrigation conduit 11. The inner member has two identical integral sections 23 and 23a and an integral shoulder 25 between these sections. For purposes of this description, only the inner member section 23 is described in detail and portions of the section 23a are designated by corresponding reference numerals followed by the letter a.

The section 23 has an outer surface 29 (FIGS. 6 and 7). The outer surface has a circular circumferentially extending region 31 and a nose section 33 extending in one direction from the region 31. The nose section 33 comprises a conical ramp section 35 and a cylindrical lead section 37 which has reduced dimensions to facilitate insertion of the inner member 23 into the primary passage 17. The ramp section 35 is sloped to facilitate sliding movement of the irrigation conduit 11 over the region 31.

The outer surface 29 also has a first conical surface 39 which extends from the region 31, away from the nose section 33. The first conical surface 39 tapers radially inwardly at a small angle of taper as it extends away from the region 31.

The coupling 13 also includes identical locking members 47 and 47a and portions of the locking member 47a corresponding to portions of the locking member 47 are designated by corresponding reference numerals followed by the letter a. The locking member 47 has a sleeve 51 with an inner surface 53 defining a passage 55 through the sleeve. The inner member 24 and the flexible conduit 11 are received within the passage 55 with the inner surface 53 confronting the outer surface 29 of the inner member. The inner surface 53 of the sleeve 51 has a second conical surface 59 which tapers radially inwardly at an angle of taper and terminates in a substantially circular knife edge 61. The angle of taper of the second conical surface 59 is greater than the angle of taper of the first conical surface 39. Each of these angles of taper is the acute angle between the associated conical surface and the central axis of such conical surface. In the assembled condition shown in FIG. 7, the conical surfaces 39 and 59 are preferably substantially coaxial. As shown in FIG. 7, the conical surfaces 39 and 59 diverge as they extend toward the circumferentially extending region 31, and this angle of divergence, i.e. the difference in the angles of taper, should be at least about 15°. In the embodiment illustrated, the angle of taper of the conical surface 39 is about 4° and the angle of taper of the conical surface 59 is about 45°.

The sleeve 51 of the locking member 47 has an intersecting wall 65 which intersects the second conical surface 59 to define the knife edge 61. In the embodiment illustrated, the intersecting wall 65 lies in a radial plane, and it intersects the conical surface 59 to define an included angle 67. Preferably the angle 67 is no greater than about 60°.

The knife edge 61 should be sharp enough to readily displace material of the wall 15 of the conduit 11. Preferably, the knife edge 61 should be no more than about 0.005 inch in axial dimension or 0.003 inch of radius.

The locking member 47 has retaining fingers (three being illustrated) which are joined to the sleeve 51 and project radially inwardly as they extend axially away from the sleeve. The retaining fingers 71 are equally spaced circumferentially.

Figure 3:
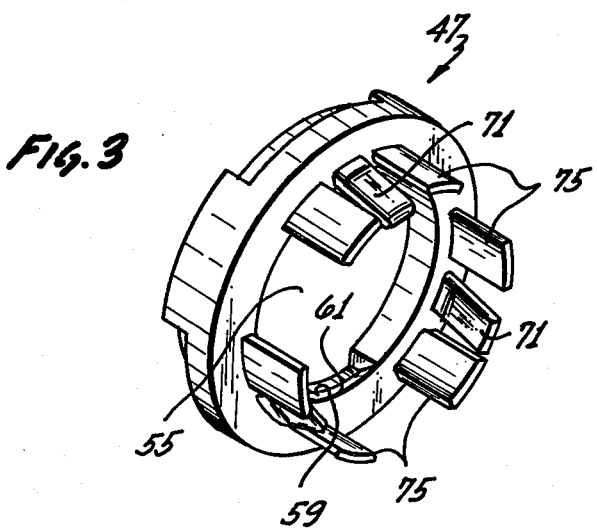
FIG. 3 is a perspective view of the locking member from the other side thereof.

In addition to the retaining finger 71, the locking member 47 may optionally be provided with one or more spacing fingers 75 and six fingers 75 are shown in FIG. 3. The spacing fingers 75 are joined to the sleeve 51 and are spaced circumferentially from each other and the retaining fingers 71.

The sleeve 51 of the locking member 47 is preferably provided with one or more notch portions 79 when the coupling 13 is to be used with a conduit such as the irrigation conduit 11. Three of the notch portions 79 are provided in this embodiment. The notch portions 79 are arranged such that the second conical surface 59 at the notch portions 79 is longer in the axial direction than the second conical surface 59 outside of the notch portions 79. When the coupling 13 is used with conduits of regular cross sectional configuration, the notch portions 79 can be eliminated.

Figure 2:
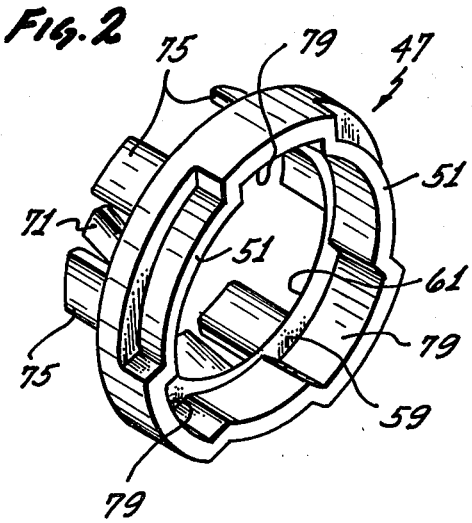
FIG. 2 is a perspective view of a locking member from one side thereof.
Figure 4:
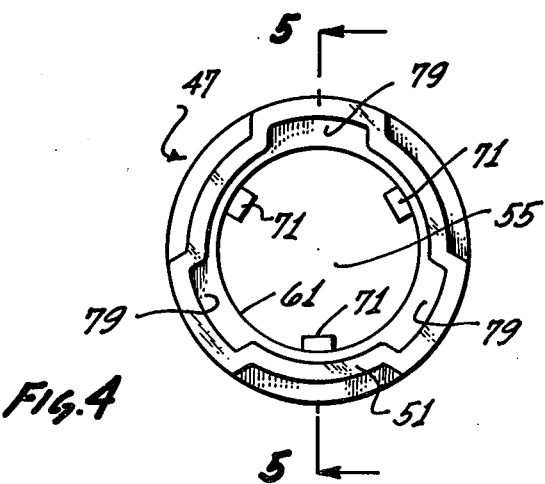
FIG. 4 is an end elevational view of the locking member.

The notch portions 79 are provided on one side of the sleeve 51 and the retaining fingers 71 and the spacing fingers 75 are provided on the other side of the sleeve 51, as shown in FIGS. 2 and 3. The retaining fingers 71 are circumferentially displaced from the notch portions 79 as can be seen in FIG. 4. This arrangement insures that the retaining fingers 71 do not interfere with the secondary passage 19 of the irrigation conduit 11 of FIG. 1 when the secondary passage 19 passes through the notch portion 79 (as shown in FIGS. 6 and 7). Any one of the plurality of notch portions 79 may be utilized to receive the secondary passage 19.

The inner member 24 and the locking members 47 and 47a can be integrally molded from a suitable plastic material. Of course, other materials, such as metal, and other manufacturing techniques can be used to make these coupling components.

The coupling 13 of the present invention can be attached to the irrigation conduit 11 by first positioning the locking member 47 with the fingers 71 and 75 in an abutting relationship with shoulder 25 as shown in FIG. 6. The section 23 of the inner member 24 is received within the primary passage 17 of the irrigation conduit 11 and one of the notch portions 79 is oriented to face and receive the secondary passage 19. The irrigation conduit 11 is forced to the right as viewed in FIG. 6 to urge the conduit into the annular gap 81 (FIG. 6) between the knife edge 61 and the outer surface 29 of the inner member 24. The increased length of the second conical surface 59 at the notch portions facilitates squeezing the secondary passage 19 within the annular gap 81 and past the knife edge 61.

Next the conduit 11 is moved to the left as viewed in FIG. 6, and the engagement of the knife edge 61 and the conduit 11 causes the locking member 47 to move to the left with the conduit 11. As the locking member 47 moves in this direction it "rides up" the taper of the conical surface 39 to the position of FIG. 7, and this decreases the radial dimension of the gap to force the wall 15 of the conduit 11 more tightly against the knife edge 61. The radial compressive load on the wall 15 of the conduit 11 is sufficient to extrude material of the wall axially of the knife edge 61. This collapses and sealingly closes the secondary passage 19 and creates a fluid tight seal between the coupling 13 and the primary passage 39. Thus, the circular knife edge 61 and the conical surface 39 cooperate to perform these passage closing and sealing functions on a conduit of noncircular cross section. The extrusion described above should be sufficient to overcome variations in wall thickness of the conduit 11, and the slight resilience of the locking member is sufficient to accommodate minor eccentricities in the conical surface 39 and thickness of the wall 15 of the conduit 11.

The locking member 47a and the section 23a of the inner member 24 may be used in the same manner described above to couple the coupling to another section of the conduit 11. Of course, the coupling 13 can also be used with cylindrical or single passage conduits.

FIG. 8 shows a locking member 47b which is identical to the coupling 47 except that the fingers 75 are eliminated. Portions of the locking member 47b corresponding to portions of the locking member 47 are designated by corresponding reference numerals followed by the letter b.

Although exemplary embodiments of the invention have been shown and described, many changes, modifications and substitutions may be made by one having ordinary skill in the art without necessarily departing from the spirit and scope of this invention.

I claim:

1. A coupling for flexible conduit which is noncircular in radial cross section and has a wall, said coupling comprising:

an inner member adapted to be at least partially received within the flexible conduit;

said inner member having an outer surface, said outer surface having a circumferentially extending region, a nose section extending in one direction from said region and adapted to facilitate insertion of the inner member into the flexible conduit, and a first conical surface extending in the other direction from said region and said first conical surface tapering radially inwardly as it extends away from said region;

a locking member adapted to receive the inner member and the flexible conduit;

said locking member including a sleeve with an inner surface defining a passage through the sleeve for receiving the inner member and the flexible conduit, said inner surface confronting said outer surface of said inner member when the sleeve receives the inner member in said passage;

said inner surface having a second conical surface which tapers radially inwardly and terminates in substantially a knife edge which is no more than 0.005 inch in axial dimension or has no more than a 0.003 inch radius;

said sleeve having an intersecting wall which intersects said second conical surface of the inner surface at an angle of no more than about sixty degrees to define said knife edge;

the angle of taper of the second conical surface being greater than the angle of taper of the first conical surface of the outer surface; and whereby when the inner member receives the flexible conduit with the first and second conical surfaces confronting and tapering in the same direction, said first and second conical surfaces diverge at least 15 degrees as they extend toward said circumferentially extending region and the wall of the flexible conduit can be radially squeezed between the knife edge and the first conical surface of the outer surface to displace some material of the flexible conduit to tightly attach the flexible conduit to the coupling.

2. The coupling of claim 1 wherein said locking member is sufficiently resilient to accommodate some variation in the thickness of said wall of the conduit.

3. The coupling of claim 1 wherein said locking member further includes at least one retaining finger attached to said sleeve and projecting radially inwardly as it extends axially away from said sleeve and said retaining finger is adapted to frictionally engage said circumferentially extending region.

4. The coupling of claim 1 wherein said locking member further includes at least one finger attached to said sleeve and extending generally axially therefrom.

5. The coupling of claim 1 wherein said locking member further includes at least one retaining finger attached to said sleeve and projecting radially inwardly as it extends axially away from said sleeve, and at least one spacing finger attached to said sleeve and spaced from said retaining finger.

6. The coupling of claim 1 wherein said sleeve further includes at least one notch portion, said second conical surface at said notch portion being longer in the axial direction than the second conical surface outside of said notch portion.

7. The coupling of claim 1 wherein said locking member further includes a plurality of fingers attached to said sleeve and projecting radially inwardly as they extend axially away from said sleeve, and a plurality of notch portions, said second conical surface at said notch portions being longer in the axial direction than the second conical surface outside of said notch portions, said fingers being attached to one side of said sleeve and said notch portions being situated on the opposite side of said sleeve and circumferentially displaced from said fingers.

8. An irrigation line comprising:

a flexible irrigation conduit having wall means defining a primary passage and a secondary passage with a common wall between said passages, said conduit having transfer ports in the common wall between said passages and discharge ports leading from the secondary passage to the exterior of the irrigation conduit;

said irrigation conduit being noncircular in radial cross section;

a coupling comprising a locking member and an inner member, said inner member being adapted to be at least partially received within the flexible irrigation conduit;

said inner member having an outer surface, said outer surface having a circumferentially extending region, a nose section extending in one direction from said region and adapted to facilitate insertion of the inner member into the flexible conduit, and a first conical surface extending in the other direction from said region, and said first conical surface tapering radially inwardly as it extends away from said region;

said locking member being adapted to receive the inner member and the flexible conduit;

said locking member including a sleeve with an inner surface defining a passage through the sleeve for receiving the inner member and the flexible conduit, said inner surface confronting said outer surface of said inner member when the sleeve receives the inner member in said passage;

said inner surface having a second conical surface which tapers radially inwardly and terminates in substantially a knife edge which is no more than 0.005 inch in axial dimension or has no more than a 0.003 inch radius;

said sleeve having an intersecting wall which intersects said second conical surface of the inner surface at an angle of no more than about 60 degrees to define said knife edge;

the angle of taper of the second conical surface being greater than the angle of taper of the first conical surface of the outer surface; and whereby when the inner member receives the flexible conduit and with the first and second conical surfaces confronting and tapering in the same direction, said first and second conical surfaces diverge at least 15 degrees as they extend toward said circumferentially extending region and the wall of the flexible conduit can be radially squeezed between the knife edge and the first conical surface of the outer surface to displace some material of the wall of the flexible conduit to tightly attach the flexible irrigation conduit to the coupling.

9. The irrigation line of claim 8 wherein said sleeve further includes at least one notch portion, said second conical surface portion at said notch portion being longer in the axial direction than the second conical surface outside of said notch portion, and said secondary passage is received in said notch portion.

10. The irrigation line of claim 9 including at least one finger projecting generally axially from one side of the sleeve and circumferentially offset from said notch portion, said notch being on the other side of said sleeve.

* * * * *